United States Patent Office 3,519,038
Patented July 7, 1970

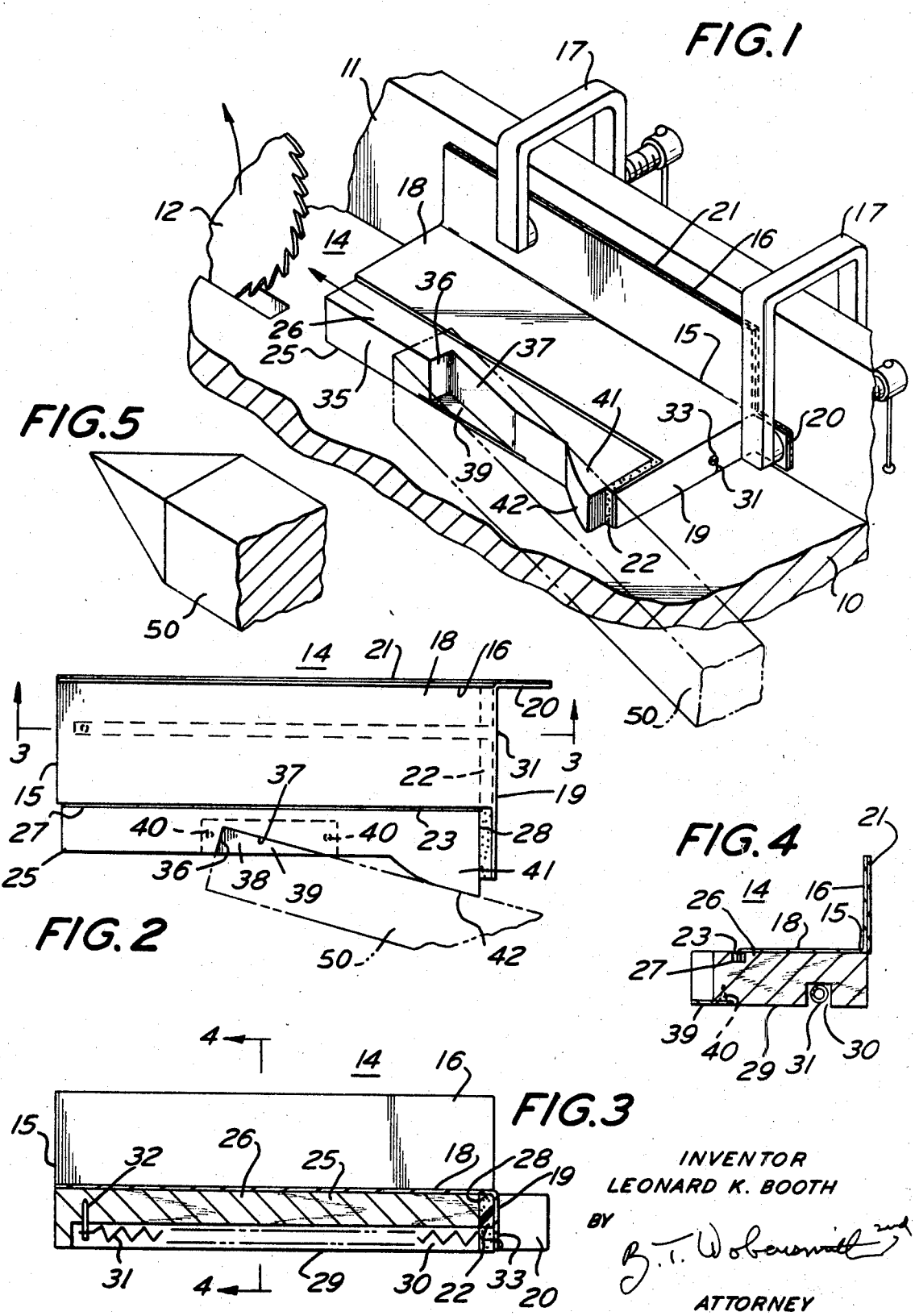

3,519,038
STAKE POINTER
Leonard K. Booth, 15133 Wayside Road,
Philadelphia, Pa. 19116
Filed Nov. 6, 1968, Ser. No. 773,767
Int. Cl. B27b 25/10, 27/06
U.S. Cl. 143—51                                    8 Claims

ABSTRACT OF THE DISCLOSURE

An attachment is provided for pointing wooden stakes which can be detachably secured to the rip fence of a saw table. The attachment includes a fixed support and a slidable guide which has a recess for the end of the stake to be cut upon movement of the guide. The guide is resiliently returned and the return movement can be utilized to eject the waste material. Provision is also made to prevent the waste material, prior to positive ejection from falling into the slot in the saw table contiguous to the saw blade.

BACKGROUND OF THE INVENTION

Field of the invention

This invention relates to attachments for pointing wooden stakes and more particularly to such an attachment which has a reciprocatory guide which is movably mounted on a support secured to the rip fence of a saw table.

Description of the prior art

Wooden stakes are widely used by builders and it is essential that they be quickly and inexpensively produced and that their pointed ends be symmetrical to aid in the straight driving thereof into the ground.

Various guides have heretofore been proposed for making diagonal cuts but these have various shortcomings and are not suited for rapid pointing of wooden stakes. One shortcoming of guides heretofore available is the lack of any effective provision for guide removal of the waste material from the location of the cut. Prior guides, also, were bulky, difficult to attach and remove and were not suited for cutting the stake end from two or four sides as described from either flat or square material.

SUMMARY OF THE INVENTION

In accordance with the present invention an attachment for pointing wooden stakes is provided which includes a support adapted to be detachably secured to the rip fence of a saw table or the like and has a resiliently impelled guide slidable with respect thereto. The support is securely retained in place. The guide has a recess for the end of the stake to be cut and an additional recess which facilitates the removal of the waste material and is cushioned at one end of its stroke.

It is the principal object of the present invention therefor to provide an attachment for pointing the ends of stakes which is simple to mount on the rip fence of a saw table and which can be readily removed if desired.

It is a further object of the present invention to provide in an attachment of the character aforesaid a stake end guide for the reception of the end of the stake to be cut and which can be impelled against a resilient force, the force being effective upon completion of the cut to return the guide to its initial position and in so doing cause the ejection of the waste material which has been cut to provide part of the stake point.

It is a further object of the present invention to provide an attachment for pointing stakes which is safe and reliable in its operation, is sturdy, is inexpensive to construct, and which has no maintenance problems.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which:

FIG. 1 is a view in perspective of an attachment in accordance with the invention, secured in place for use and showing the manner of advance of the stake to a saw blade;

FIG. 2 is a top plan view of the attachment removed from the saw table;

FIG. 3 is a longitudinal sectional view, taken approximately on the line 3—3 of FIG. 2;

FIG. 4 is a transverse sectional view taken approximately on the line 4—4 of FIG. 3; and FIG. 5 is a view in perspective showing the pointed end of a stake.

It should, of course, be understood that the description and drawings herein are illustrative merely, and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings, the horizontal table 10 of a power driven saw is there illustrated with a rip fence 11 secured thereto in any desired manner, and parallel to the plane of a rotable saw blade 12. Any other type of saw may be employed including a band saw (not shown) or a blade mounted beneath the table 10 and projecting upwardly therethrough.

The attachment 14 in accordance with the present invention includes a fixed support 15, preferably made of sheet metal, which has a vertical upright mounting plate portion 16 detachably securing the support 15 to the fence 11 and preferably by screw actuated C-clamps 17 of well known type.

The support 15 has a horizontal elongated body portion 18 with a vertically downwardly extending end flange 19 which provides a stop and from which a vertical positioning flange 20 extends. The flange 20 is available for engagement by one of the C-clamps 17.

The mounting plate portion 16 and end flange 20 preferably have a friction or non-slip facing 21.

Within the end flange 19 a resilient insert 22 of rubber or the like is secured to serve as a bumper to cushion the impact upon return movement.

The horizontal body portion 18 of the support 15 at the edge thereof opposite the plate 16 has a downwardly extending guide flange 23.

The guide 25 comprises a block which may be of wood, plastic composition, or metal with a flat top face 26 having a groove 27 therealong within which the flange 23 extends.

The guide 25 has a vertical end face 28, which engages the insert 22 and a bottom face 29 with a groove 30 therealong. Within the groove 30 a tension spring 31 is mounted secured at one end to an abutment pin 32 and at the other end in an opening 33 in the end flange 19.

The guide block 25 has a vertical side face 35 which is movable alongside of the saw blade with an inwardly extending angularly disposed end face 36 from which a diagonal side face 37 extends to the side face 35. A slot 38 is thus provided for the end of the stake blank.

At the bottom of the slot 38 and inset within the bottom face 29 a retainer plate 39 is provided which is held in place by screws 40.

The guide block 25 also preferably has a side extension 41 with a positioning face 42 aligned with the diagonal side face for aiding in positioning the stake blank 50.

The manner of use will now be pointed out.

With the attachment 14 held in place by C-clamps 17, and with the side face 35 positioned with respect to the saw blade 12 so as to effect the desired location of cut, the stake blank 50 is placed so the end at which the first cut is to be made is in engagement with the end face 38 and with one of its side faces engaged with the side face 37 and with the positioning face 42 and the contiguous side face of the blank 50 engaged on the plate 39 and the table 10.

The stake blank 50 is then advanced, as thus positioned, against the force of the spring 31 to engage the blank 50 with the saw blade 12 which cuts one of the diagonal end faces of the finished stake. The waste or cutoff piece is in the slot 38.

Upon completion of this cutting operation, the stake blank 50 is retracted and slid back to its initial position while turning it about its longitudinal axis ready for the next cut. The completion of the cutting operation permits the retraction by spring 31 of the guide block 25, since upon such completion the stake blank 50 has no further contact at the faces 36 and 37. The spring 31 is then effective for rapidly returning the guide block 25. Upon the rapid return of the guide block 25, the impact of the striking of the end face 28 on the bumper 22 causes the waste piece in the slot to be impelled therefrom, and to an extent and to a distance such that it does not interfere with the placing of the stake blank 50 for the next cut.

The operation previously described of initially placing the stake blank 50 with an end engaging the end face 36 and with a side face engaging the diagonal face 37 and the positioning face 42 and advancing the blank 50 as thus positioned is repeated for each cut to be made by the saw blade 12. Either two or four cuts are made, in accordance with the style of end pointing desired on the stake blank 50.

It will thus be seen that a stake pointer has been provided for carrying out the objects of the invention.

I claim:

1. A stake pointer for use with a saw having a saw table with a rip fence thereon which comprises
a fixed support having
    a horizontal body with a vertical plate portion for clamping to the rip fence, and
    a longitudinal downwardly extending guide flange; and
a guide block for movement on the saw table having
    a top face with a longitudinal groove in which said guide flange is disposed for longitudinal slidable movement of said guide block,
said guide block having a side face for movement along the saw with a notch thereon for reception of the end of a stake blank and for waste material cut by the saw from said blank.

2. A stake pointer as defined in claim 1 in which
a resilient member is provided connecting said guide block and said support for urging said guide block to a predetermined position.

3. A stake pointer as defined in claim 2 in which
said guide block has a recess thereon within which said resilient member is disposed.

4. A stake pointer as defined in claim 2 in which
said block has an end face.
said fixed support has an end flange disposed parallel to said face, and
a resilient bumper is interposed between said end face and said end flange.

5. A stake pointer as defined in claim 1 in which
said notch has an end face for stake end engagement, and
a retainer plate for waste material is provided on said guide block at the bottom of said notch.

6. A stake pointer as defined in claim 1 in which
said block, in spaced relation to the notch has a side extension with a positioning face for engagement by the stake blank.

7. A stake pointer as defined in claim 1 in which
said vertical plate portion has a friction face for engagement with the rip fence.

8. A stake pointer as defined in claim 2 in which
a retainer plate for cutoff material is provided at the bottom of said notch, and
a resilient bumper is interposed between said fixed support and said guide block for accommodating impact of said guide block upon movement of said guide block by said resilient member and for impelling said cutoff material out of said notch.

References Cited

UNITED STATES PATENTS

| | | | |
|---|---|---|---|
| 1,452,233 | 4/1923 | Zsuffa | 143—169 |
| 2,083,435 | 6/1937 | Damlin | 143—51.1 |
| 2,679,868 | 6/1954 | Johnson | 143—169 X |

WILLIAM S. LAWSON, Primary Examiner

L. GILDEN, Assistant Examiner

U.S. Cl. X.R.

143—168